United States Patent Office 3,165,854
Patented Jan. 19, 1965

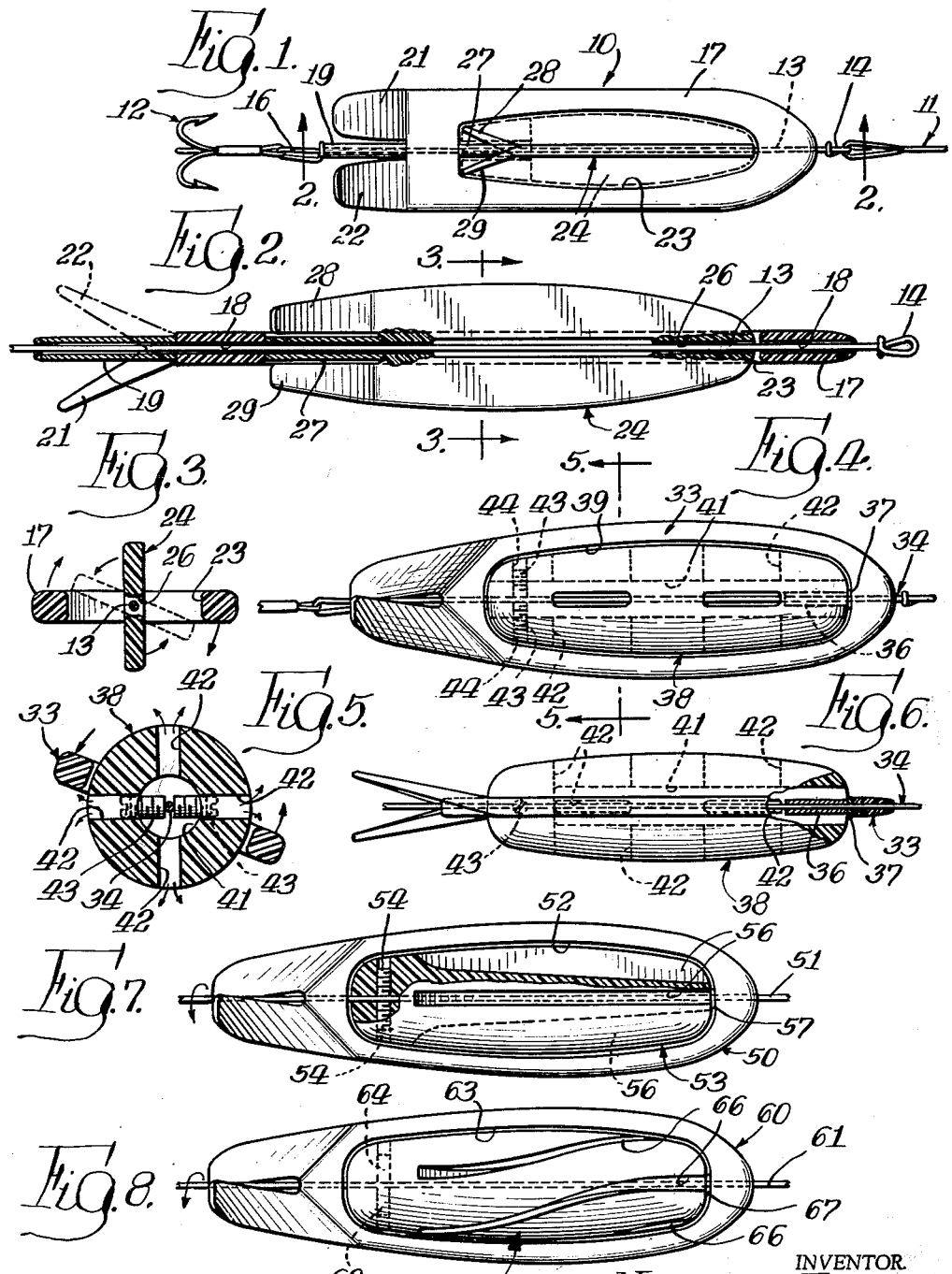

3,165,854
SONIC FISH LURE
Herman Teetor, Hagerstown, Ind.
(Box 347, Walloon Lake, Mich.)
Filed Oct. 8, 1962, Ser. No. 228,855
5 Claims. (Cl. 43—17.1)

This invention relates to fish lures, and more particularly, to a fish lure that generates underwater sonic waves.

It has been definitely established that fish are attracted to a source of underwater vibrations, or sonic waves. To attract fish to their vicinity, fishermen have used electric vibrators, commonly known as fish callers, or buzzers, and to a lesser extent, fish lures designed to flutter in the water. An electric vibrator is unsatisfactory because it is relatively expensive and it attracts fish to itself and not to a fisherman's hook. Fluttering fish lures, on the other hand, are unsatisfactory because the mechanism which causes fluttering is easily damaged by casting, and the lure easily becomes tangled in weeds or in a fisherman's line.

Accordingly, it is a primary object of this invention to provide an improved fish lure that generates underwater sonic waves as it moves relative to the water.

It is another object to provide a fish lure of the foregoing character that is simply and ruggedly constructed.

Still another object is to provide a fish lure of the foregoing character that generates relatively strong sonic waves and does not easily become tangled with weeds or a fish line.

These and other objects of the invention will become apparent from the following detailed description taken in conjunction with the accompanying figures of the drawing, in which:

FIG. 1 is an elevational view of a fish lure embodying the invention;

FIG. 2 is an enlarged view partially in section of the lure shown in FIG. 1;

FIG. 3 is a sectional view taken on the line 3—3 of FIG. 2;

FIG. 4 is an elevational view of another form of fish lure embodying the invention;

FIG. 5 is an enlarged sectional view taken on the line 5—5 of FIG. 4;

FIG. 6 is an elevational view of a lure similar to that shown in FIG. 4;

FIG. 7 is a view partially in section of another form fish lure; and

FIG. 8 is an elevational view of still another form of fish lure.

In general, a fish lure embodying the invention comprises an elongated member adapted to be attached to a fish hook and a leader. This elongated member is constructed such that it causes a plurality of streams of water to flow outwardly from it as it is moved relative to the water. A shearing member is mounted adjacent the elongated member, and the two members are rotatable relative to each other. Means is provided for rotating one of the elongated and shearing members. A plurality of edges are formed on the shearing member, which pass closely adjacent the elongated member as the two members are rotated relative to each other. These edges shear the streams of water flowing from the elongated member, this shearing action creating pulses or vibrations in the water which attract fish.

In greater detail, FIGS. 1 to 3 is shown a fish lure indicated generally by the numeral 10, a leader indicated generally by the numeral 11, and a fish hook indicated generally by the numeral 12. The lure 10 includes a rod 13, which may be a relatively stiff preferably noncorrosive wire, having a loop 14 formed at its forward end and a loop 16 formed at its rearward end. The loop 14 is attached to the leader 11 and the loop 16 is attached to the hook 12.

The fish lure 10 further includes a spoon-like shearing member 17 rotatably mounted on the rod 13. The rod 13 passes through a pair of aligned longitudinally extending holes 18 (FIG. 2) formed in the member 17, and the holes 18 are sized to permit free rotation of the member 17 about the rod 13. A spacer 19 is mounted around the rod 13 between the rearward end of the member 17 and the rearward loop 16 of the rod 13 to make rotation of the member 17 easier. A pair of fins 21 and 22 are formed at the rearward end of the member 17, the fins being curved in opposite directions to cause the member 17 to rotate in the clockwise direction as seen in FIG. 3 as the lure is moved from left to right of FIGS. 1 and 2 relative to the water.

An elongated opening 23 is formed through the shearing member 17, and an elongated water flow producing member 24 is positioned within the opening 23. In the embodiment shown in FIGS. 1 to 3, this member 24 has the shape of a flat spoon, and a longitudinally extending hole 26 is formed in it through which the rod 13 extends, the hole 26 being sized to permit free rotation of the member 24. A spacer 27 is positioned around the rod 13 between the rearward end of the member 24 and the shearing member 17. A pair of fins 28 and 29 are formed at the rear of the member 24, the fins being curved in opposite directions to make the member 24 rotate in the counterclockwise direction as seen in FIG. 3, when the lure is drawn through the water from left to right of FIGS. 1 and 2. The spacer 27 is positioned between the two fins 28 and 29 and prevents these fins from contacting the outer shearing member 17 as the inner member 24 rotates.

In use, the fish lure is attached to a trolling or casting line and placed in the water. When the lure moves from left to right as seen in FIGS. 1 and 2 relative to the water, the fins 28 and 29 cause the inner member 24 to move in the counterclockwise direction and the fins 21 and 22 cause the shearing member 17 to move in the clockwise direction as seen in FIG. 3. The flat surfaces forward of the fins 28 and 29 of the inner member 24 throw water outwardly as the member 24 rotates, and each time the longitudinal edges of the opening 23 of the shearing member 17 pass adjacent the outer edges of the inner member 24, the stream of water between each pair of edges is sheared. This shearing of the water causes vibrations in the water, the freqeuncy of which is determined by the relative rates at which the two members 17 and 24 rotate.

In the forms of the invention shown in FIGS. 4 to 6, a shearing member 33 and a rod 34 are provided which are identical with the member 17 and the rod 14, respectively, shown in FIG. 7. The shearing member 33 is held against rearward movement relative to the rod 34 by a sleeve 36 (FIGS. 4 and 6) secured to the rod 34 as by crimping, and a washer or bearing 37 positioned between the forward end of the sleeve 36 and the shearing member 33.

An inner flow producing member 38 is positioned within an opening 39 formed in the shearing member 33. It is circular in cross section and its outer diameter is slightly less than the width of the opening 39. In the form of the invention shown in FIGS. 4 and 5, a cavity 41 is formed through the inner member 38 from its forward end to its rearward end, and a plurality of radially extending slots 42 are formed through the member 38 from the cavity 41 to the outer surface of the member 38. The member 38 is positioned with the rod 34 extending through the center of the cavity 41, and it is secured to the rod 34 by a pair of set screws 43 threaded through holes 44 (FIGS. 4 and 5) and engaging the rod 34. In the form of the invention shown in FIG. 6, the inner flow producing member 38 is identical with that shown in FIGS. 4 and 5, with the exception that the rearward end of the cavity 41 is closed.

As either of the lures shown in FIGS. 4 and 6 is drawn through the water, the inner flow producing member 38 remains stationary relative to the rod 34 while the outer shearing member 33 rotates about it in the counter-lockwise direction as seen in FIG. 6, a pair of fins at the rearward end of the shearing member 33 producing this motion. Water flows into the forward end of the cavity 41 and out through the slots 42. As the inner edges of the opening 39 in the shearing member 33 pass the slots 42, they shear the streams of water emanating therefrom, and thereby generate pulses or vibrations in the water.

In the form shown in FIGS. 4 and 5, a portion of the water entering the forward end of the cavity 41 flows out the rearward end of the cavity. In FIG. 5 where the cavity is closed at its rearward end, all of the water flows outwardly through the slots 42.

In FIG. 7, an outer shearing member 50 identical with the shearing members 17 and 33 of FIGS. 1 to 6 is provided, rotatably mounted on a rod 51. The member 50 has an opening 52 formed in it, and an inner flow producing member 53 is mounted within the opening 52 and is secured to the rod 51 by set screws 54. A washer or bearing 57 positioned between the forward end of the inner member 53 and the outer shearing member 50 enables the shearing member 50 to rotate freely relative to the inner flow producing member 53. A plurality of longitudinally extending slots 56 are formed in the inner member 53, the slots 56 preferably decreasing in depth from the forward end of the inner member to its rearward end.

As the lure shown in FIG. 7 is drawn from left to right through the water, a stream of water flows through each slot 56, and the decreasing depth of the slots forces these streams to flow outwardly past the rotating shearing member 50, which shears these streams and produces pulses in the water.

The lure shown in FIG. 8 also includes a shearing member 60 rotatably mounted on a rod 61, constructed exactly as previously described with regard to the other forms of the invention. A flow producing member 62 is positioned within an opening 63 formed in the member 60, the inner member 62 being secured to the rod 61 by set screws 64. A washer 67 positioned between the forward end of the inner member 62 and the shearing member 60 enables free rotation of the latter member. A plurality of grooves 66 are again formed in the inner member 62, these grooves extending longitudinally and also spiraling a small amount. These grooves 66 also have a greater depth at the forward end of the inner member 62 than at the rearward end so that the streams of water flowing through them are forced radially outward past the shearing member 60. The spiraling grooves 65 tend to cause rotation of the lure in the direction opposite the direction of rotation of the outer shearing member 60. This counteracts the tendency of the shearing member 60 to turn the entire lure, with the result that the entire lure does not rotate and twist the trolling or casting line. In the form of the invention shown in FIGS. 1 to 3, the rotation of the two members 17 and 24 may be adjusted so that the entire lure does not rotate by adjusting the angle and size of the fins formed on these members.

In addition to attracting fish by the vibrations produced, the two members of the lure may be provided in various colors and designs to produce effective visual attraction as well.

I claim:

1. A sonic fish lure comprising an elongated member adapted to be attached to a fish line and drawn through the water, said elongated member being formed for producing a plurality of streams of water, and a shearing member mounted adjacent said elongated member, said members being relatively rotatable, said shearing member having at least one edge formed thereon which passes closely adjacent said elongated member and shears said streams of water as said elongated and shearing members rotate relative to each other, to thereby create vibrations in the water, said elongated member having a longitudinally extending cavity and a plurality of laterally extending slots formed therein from said cavity to its outer surface for producing said streams of water.

2. A sonic fish lure as in claim 1, wherein said cavity is closed at its rearward end and open at its forward end.

3. A sonic fish lure comprising an elongated member adapted to be attached to a fish line and drawn through the water, said elongated member being formed for producing a plurality of streams of water, and a shearing member mounted adjacent said elongated member, said members being relatively rotatable, said shearing member having at least one edge formed thereon which passes closely adjacent said elongated member and shears said streams of water as said elongated and shearing members rotate relative to each other, to thereby create vibrations in the water, said elongated member having a plurality of longitudinally extending grooves formed in its outer surface, said grooves being shallower at their rearward end than at their forward end and producing said streams of water.

4. A sonic fish lure as in claim 3, wherein said grooves also spiral around said elongated member.

5. A sonic fish lure as in claim 4, including means for supporting said members, said elongated member being secured to said supporting means and said grooves in said elongated member tending to cause rotation of said elongated member in one direction on movement relative to the water, and said shearing member being rotatably mounted on said supporting means and including fins causing it to rotate in the other direction as the lure is moved relative to the water, the pitch of said grooves being such as to offset the tendency of the rotation of and shearing member to rotate said supporting means.

References Cited in the file of this patent

UNITED STATES PATENTS

| 2,002,117 | Lavitt | May 21, 1935 |
| 2,606,387 | Garner | Aug. 12, 1952 |
| 2,653,408 | Bradley | Sept. 29, 1953 |